United States Patent [19]
Hallerback

[11] 3,858,070
[45] Dec. 31, 1974

[54] BEARING CENTERING STRUCTURE FOR ROTARY ELECTRIC APPARATUS
[75] Inventor: Stig Lennart Hallerback, Vastra Frolunda, Sweden
[73] Assignee: SKF Industrial Trading and Development Company N.V., Overtoom, Amsterdam, Netherlands
[22] Filed: Apr. 3, 1974
[21] Appl. No.: 457,400

Related U.S. Application Data
[63] Continuation of Ser. No. 285,111, Aug. 31, 1972, abandoned.

[30] Foreign Application Priority Data
Nov. 19, 1969 Netherlands ........................ 6917401

[52] U.S. Cl. .................................. 310/90, 310/43
[51] Int. Cl. ............................................ H02k 5/16
[58] Field of Search .......... 310/90, 43, 260, 89, 270

[56] References Cited
UNITED STATES PATENTS

| 2,450,982 | 10/1948 | O'Brien | 310/90 UX |
| 2,462,204 | 2/1949 | Ludwig | 310/90 UX |
| 3,161,794 | 12/1964 | Lindgren | 310/90 X |
| 3,200,275 | 8/1965 | Lindgren | 310/90 |
| 3,319,093 | 5/1967 | Abdul | 310/43 X |
| 3,444,402 | 5/1969 | Cartier | 310/43 |
| 3,544,820 | 12/1970 | Wightman | 310/43 X |

Primary Examiner—Donovan F. Duggan
Attorney, Agent, or Firm—Howson and Howson

[57] ABSTRACT

Rotary electric apparatus comprising a stator unit having a lamellate stator core including a rotor chamber, a rotor mounted on a shaft for rotary motion relative to the stator, bearing means mounted on the shaft, bearing support means connected to the bearing means and stator unit and a molded guide member secured to the stator at least at one axial end face thereof defining a seat for the bearing support member, said guide member being of a predetermined cross section to provide a centering surface coaxial with the rotor chamber and radial abutment surface spaced from each other a predetermined axial distance.

1 Claim, 6 Drawing Figures

BEARING CENTERING STRUCTURE FOR ROTARY ELECTRIC APPARATUS

This is a continuation, of application Ser. No. 285,111 filed Aug. 31, 1972 now abandoned.

The present invention relates to a method for manufacturing a stator for electric motors and other rotary electric machines of the type having cup-shaped bearing supports fixed by the larger end to the stator core inside the winding heads of the stator and which carry a rotor bearing at the smaller end.

An electric machine, e.g. an electric motor which is built with the rotor assembly supported by the central portions of the stator inside the winding heads offers substantial advantages. Due to the fact that the central part of the stator core guides and supports the rotor assembly, the machine can be built with a great geometrical accuracy and to close dimensional specifications, as its essential measurements are not determined by a whole chain of tolerances, as is the case with conventional rotary electric machines wherein the rotor assembly is supported by the stator core via the stator outer mantle and the end shields and wherein the dimensional tolerances add up to a chain of varying length. Thus variations in measurements and geometry can be kept within much closer limits than in conventional machines. In this way a silent running and a high efficiency of operation is attained. Small dimensions and low manufacturing costs compared with conventionally built motors are further within reach. A prerequisite for the above mentioned advantages is, however, concentricity between the rotor journals and the rotor cavity of the stator, as well as the radial planes of the rotor journals being at right angles to the bearing center lines.

Even eccentricities and oblique mounting of the order of a few micrometers may have a considerable negative influence on the performance and noise level of the motor. Besides, a rigid fixation of the bearing supports is required.

The difficult part in building machines comprising the aforesaid favorable bearing arrangements is, however, that an extremely limited space, in small motors normally 1 to 2 millimeters in the radial direction, is available for the centering and fixation of the bearing support in the axial as well as the radial direction, while attention must also be paid to the need for electric insulation from the winding heads. Further, the end faces of a conventional stator core built of punched plates do not afford a sufficiently accurate and rigid support for the guiding and fixation of the bearing support. The existence of slots for the stator windings in the stator core, said slots being open towards the rotor cavity and extending from end to end, will reduce the stator core, inside the winding heads, to a multitude of thin sheet metal tongues that, especially in small motors, are very narrow. Since the compressive force brought forth by riveting, casting, welding, etc. of the stator plate package close to the outer periphery of the stator core cannot be entirely transmitted to these thin and narrow sheet metal tongues separating the winding slots, the end faces of the stator core will assume an essentially conical shape. Furthermore, the end faces of the stator core suffer of a certain waviness and other, larger or smaller irregularities, resulting from the punching out of the stator plates.

Several different suggestions for the construction of motors with the rotor assembly supported by the stator core inside the winding heads are priorly known. In the simplest arrangements it is proposed to locate the bearings of the rotor assembly or bearing supports relative to the stator core by making use for this purpose of its rotor cavity or its end plates. Such suggestions, however, do not make provision for the irregularities of the stator core, referred to, and do not meet even small demands as to accuracy and rigidity of fixation.

Further, it has been suggested to provide the stator core with special end elements having a greater depth and extending beyond the rotor, by which elements the rotor assembly can be supported. Such end elements will, however, also be influenced by the inaccuracies of the mating surfaces.

In order to be able to provide the necessary accuracy and rigidity such thickened end elements of the stator core must be of an essentially greater depth and stiffness than the punched sheets of the stator core. Even such an element will be affected by the aforementioned inaccuracy of the end faces of the plate package. The ensuing increase of the stator core length means, at the same time, that one of the objects of the bearing arrangement now considered will be counteracted, making for a larger motor, demanding a greater amount of copper wire and also in other respects increased costs of manufacture of the stator, due, among other things, to the difficulty in making thick extension elements with winding slots at low cost.

Instead of guiding and securing the rotor system relative to the end faces of the stator it has been suggested that the bearing supports of the rotor assembly be formed with fingerlike extensions that are inserted and secured in the stator winding slots. However, it is not possible to obtain in this way a coaxial guiding of the rotor assembly with an accuracy of a few micrometers. Moreover, the manufacture of bearing supports with this kind of fingerlike extensions with a high accuracy is difficult and expensive. Furthermore, if the attaching members of the bearing supports are not made of magnetically or electrically non-conducting material the electric properties of the motor are affected negatively. The use of such non-conducting materials, however, will give rise to other problems.

For the fixation of the rotor assembly to the stator inside the winding heads, it has priorly been suggested to use bolts, rivets, etc. passing through the whole length of the stator core within the winding slots or through bores provided for this purpose. Normally, however, such mechanical elements encroach on the electrically active material of the stator and reduce the efficiency of the motor to a degree that is not acceptable except for motors with low demands on efficiency, e.g., motors for battery-run toys and simple domestic appliances fed from the mains supply.

For the reasons mentioned above a positive mechanical connection between the rotor assembly and the stator is practically out of question for most motors. It has been suggested, therefore, to replace the mechanical connection by employing some form of bonding for the fixation of the rotor assembly to the stator. The end face of the stator, penetrated by the winding slots, offers but an unsatisfactory bonding surface, however. The sheet metal tongues between the mouths of the winding slots present a bonding area which is much too narrow and lacks rigidity in the axial as well as the peripheral direction. Besides, already a thin layer of a bonding agent between the bearing support and a mating surface that also provides radial and axial locating means will impair still more the geometrical accuracy of the assembly. Furthermore, the stator winding slots that are open towards the rotor cavity entail, especially when assembling by methods adapted to mechanized production considerable risk for bonding substance penetrating into the rotor chamber leading to scrapping of the motor.

It is known in electric machines having their winding heads completely embedded in synthetic resin or the like to secure by a moulding substance the bearings or the bearing supports of the rotor assembly directly against the insides of the winding heads. Such embedded winding heads lack, however, the ability to take up substantial loads from the rotor bearing. The generation of heat within the winding heads embedded in synthetic resin will become unevenly distributed in the circumferential as well as the axial sense due to the fact that the copper wires are unevenly distributed within the winding heads. By that reason there will be caused, to a corresponding degree, unequal dimensional changes in the bearing assembly, and such changes might influence the efficiency of the motor in a very unfavorable way. Therefore, this bearing arrangement can only be used for motors submitted to small mechanical loads and an unimportant generation of heat. The embedding of the winding heads in synthetic resin is a method in building motors that, for cost reasons, is only used in special fields of application.

The above described difficulties pertaining to a fixation of the rotor assembly relative to the stator core inside the winding heads of the stator and the disadvantages of prior proposals for construction of such bearing arrangements explain why this method for constructing electic motors or other rotary electric machines has been infrequently, if at all used, in spite of the important advantages it might entail in itself.

The present invention has for its object to provide a rigid fixation of the rotor assembly relative to the stator inside the winding heads of the latter, in such a manner that loads transmitted from the rotor bearings via the bearing supporr are taken up directly by the stator core and at the same time such an accurate positioning of the bearing support relative to the stator core is attained that the rotor will be journalled coaxially with the rotor cavity of the stator, with the radial planes of the bearings extending at right angles to the rotor axis. Another object is to provide such a rigid fixation by bonding or moulding-in the bearing supports, where the risk of bonding agent or moulding substance penetrating into the rotor chamber through the openings offered by the stator winding slots and the risk of an impaired mechanical accuracy caused by the bonding agent or moulding substance are eliminated. A further object is to provide an inexpensive procedure of manufacturing that is well suited to common practice in the making of electric motors, and a still further object is to provide a suitable manufacturing method fo motors of grossly varying sizes and entirely different fields of use. Still another object is to make it possible to use bearing supports that can be easily manufactured with a high degree of accuracy and also of electrically conducting material. A still further object of the invention is to provide a method of manufacture that is well suited in itself for mechanization and will result in a stator that readily lends itself to subsequent mechanized assembly steps.

With these objects in view, the invention relates to a method of manufacturing a stator unit formed at the end faces of the lamellate stator core, inside the winding heads, with guiding and bonding surfaces for the larger end portion of a cup-shaped bearing support which carries a rotor bearing in its smaller end. Thereby dimensional inaccuracies and other irregularities always present in a stator core assembled of punched plates are eliminated, and an accurate positioning and rigid fixation of the bearing support relative to the stator core is obtained as well as a well-defined construction length.

The method according to the present invention comprises substantially the following steps subsequent to inserting the stator windings in the stator slots, viz. engaging a moulding member in the rotor cavity of the stator core, to be coaxially guided thereby, leaving between the stator core end face, the inside of the winding heads and said moulding member an interspace, introducing into the said interspace a setting plastic substance to form a moulding adhering to the stator core end plate and forming interspatial structures in the mouths of the stator slots, sealing off the stator slots inwardly by means of the moulding member to prevent obstruction of the rotor cavity by the said setting plastic substance, and removing the moulding member, the moulding thus formed having locating surfaces for the said cup-shaped bearing support means.

Due to the fact that the moulding member is provided with a guide surface coaxial with the rotor cavity and an abutment surface at right angles to the longitudinal axis of the rotor cavity the axial position of which is accurately determined there is formed at the stator core a centering surface as well as an axial abutment surface for the bearing support.

The method according to the invention is particularly well adapted to the manufacture of a stator unit suitable for the bonding or moulding-in of the bearing support of the rotor assembly. Due to the fact that the mouldings of lacquer or moulding mass affording the locating surfaces fill up and seal off the openings of the stator slots the material necessary for cementing-on or moulding-in the bearing support may be applied without any risk of its penetrating into the rotor cavity through the stator slots. The mouldings formed of lacquer or moulding substance also afford a bonding surface which is separate from the locating surfaces, is unbroken and is substantially circular and will permit a reliable and rigid bonding or moulding-in of the bearing support after the latter has been brought into a coaxial and axially determined position relative to the stator core by being moved into engagement with the locating surfaces. The moulded-on substance is securely anchored in the mouths of the stator slots and the adjacent portions of the winding bundles. Furthermore, the sheet metal tongues of the end stator plates separating the stator slots are bonded to the tongues of the adjacent plates axially as well as circumferentially which makes for increased rigidity of the structure.

Since the plastic moulding substance flows around and embeds geometrically uniform portions of the winding bundles and is directly in contact with the end portion of the stator core the temperature in operation and the resulting dimensional changes will be uniform and will not impair the operation characteristics of the machine. A special advantage associated with the concentration of the moulding substance to the spots where the winding bundles project from the stator slots is an improved electric insulation at the places where conventional windings are submitted to great mechanical stresses by reason of the relative movements of the copper wire and the iron of the stator due to different thermal expansion. The plastic substance or lacquer also insulates the winding heads from a bearing support made of an electrically conducting material.

After providing the stator core with the stator windings, the winding heads are usually insulated by dripping lacquer thereon, by immersion in a lacquer bath, or the like. In motors of the kind described the method steps according to the invention are preferably carried out when the lacquer is applied, as just described, the locating and bonding surfaces being shaped without the need for a separate moulding and setting operation, and at low cost. As the moulding member prevents lacquer from penetrating into the rotor cavity any need for subsequent machining of this cavity after lacquering does not arise.

To an increasing extent electric motors are manufactured wherein the stator winding heads do not require the insulation laquering referred to above. Particularly in such cases it is within the scope of the invention to apply an annulus of a plastic moulding substance around each moulding member, this annulus being after the moulding member has engaged the stator unit, urged against the end faces of the stator core, and being bonded to the said end face concurrently with plastic flow and setting thereof taking place, thereby forming mouldings corresponding to the lacquer formations earlier described.

According to a modification of the manufacturing method of the invention there is applied against the active surfaces of the moulding member a guide ring preferably of metal provided with centering and abutment surfaces corresponding to the said active surfaces for securing a bearing support thereto, said ring being, after the moulding member has been inserted in the stator unit, fixed against the stator core by applying lacquer, insulation substance or the like into the space between the end plates of the stator core, the inside of the winding heads and the guide ring.

The invention will now be described with reference to the embodiments illustrated in the annexed drawings.

In the drawings

Figure 1:
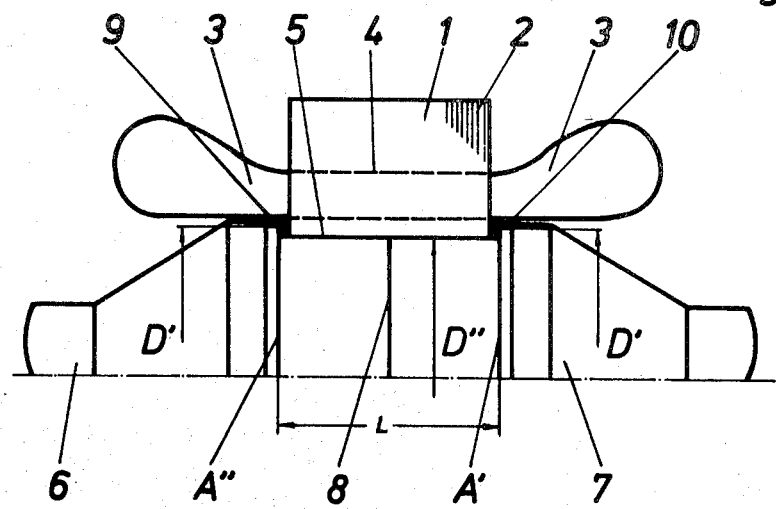
FIG. 1 is a longitudinal section view of a stator core with windings and mandrel-shaped moulding members for forming guiding and bonding surfaces at the stator core when applying insulation lacquer or substance to the stator windings.

In FIG. 1 numeral 1 denotes a stator core formed of a package of stator plates 2. The stator windings 3 are located in the stator slots 4. In the rotor cavity 5 of the stator core a moulding member 6 and 7, respectively, has been inserted from each end. These moulding members are an accurate sliding fit in the rotor cavity having the diameter $D''$ and is each provided with guide surfaces outside the stator core, among those surfaces a centering surface of the diameter $D'$ greater than $D''$. When the moulding members 6 and 7 are moved into mutual abutment at the plane 8 within the stator core, the shoulders $A'$ and $A''$ provided by the outer thicker portions of the moulding members 6, 7 will be spaced at the distance L. This distance L is a little greater than the overall length of the stator core 1. Between the stator core 1 with the windings 3 on one hand and each of the two moulding members 6, 7 on the other there will be defined L-section spaces 9 and 10, respectively, and these spaces will serve as a mould for a setting lacquer or insulating substance which is made to fill up the spaces 9 and 10, preferably when the windings are provided with layers of insulation lacquer, and will form after setting locating surfaces for the accurate positioning of the bearing supports. The moulding members 6, 7 prevent during the application of lacquer any portion thereof from penetrating into the rotor chamber at $D''$. Without any influence by different dimensional or geometrical faults of the stator core 1 there is shaped by the lacquering or moulding procedure a centering surface $D'$ coaxial with the rotor cavity $D''$, and at the same time parallel axial abutment surfaces $A'$ and $A''$ are formed, spaced from each other by the distance L.

Figure 2:
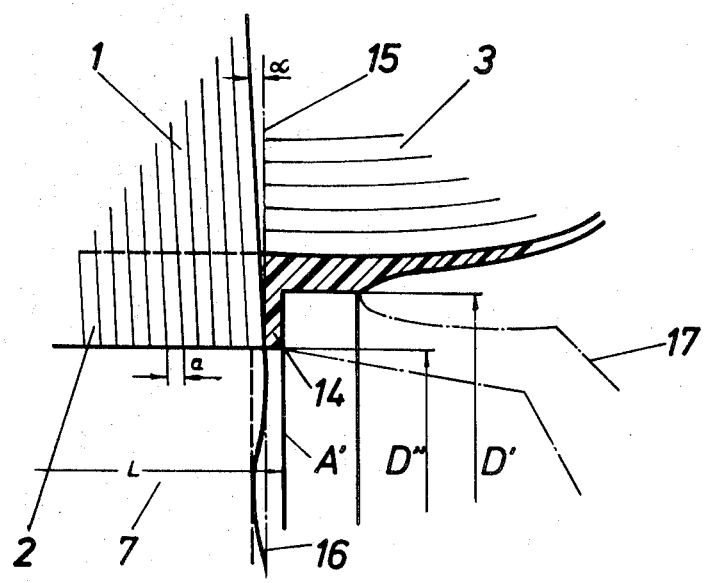
FIG. 2 is a fragmentary section view of a stator core with moulded-on guide and bonding surfaces.

FIG. 2 is a partial section view of a stator core 1 assembled of stator plates 2 each having the thickness a. This thickness is dependent of the thickness of the sheet material used, and variations therein will influence the overall length of the stator core. When the stator plates assembled to a stator core are joined together by conventional measures such as riveting, casting, welding, the outer face of the end plates cannot be brought to coincide with a radial plane 15 by several reasons. The compressive force e.g. through riveting cannot be transmitted to a full extent to the narrow sheet metal tongues that separate the stator slots, and consequently the plates will form at these portions a substantially conical surface, as denoted by the angle $\alpha$ in FIG. 2.

Another fault occurring at the end faces of the stator core is a waviness 16. The burrs formed when punching out the stator plates from sheet metal will also cause greater or smaller irregularities. The sheet metal tongues of the end plates further lack a rigid interconnection with the corresponding tongues of the inside plates. By reason of the fact that the moulding members 6 and 7 described with reference to FIG. 1 define a length L greater than the overall length of the stator core, the dimensional variations and irregularities described can be tolerated as they do not determine the overall construction length of the stator core, being compensated by thicker or thinner layers of lacquer or other insulation substance as at 14.

The application of lacquer or other insulation substance is carried out at the stator core 1 as well as at the windings 3, and the moulding member 7 assists in forming the guide surface $D'$ coaxial with the rotor cavity and the abutment surface $A'$ at right angles to the longitudinal axis of the rotor cavity. This renders possible on accurate locating of the bearing support 17 for the rotor assembly (indicated by chain lines) by means of the moulding formed by the lacquer or other insulation substance. This moulded formation also acts as an electric insulation between the winding heads and a bearing support of an electrically conducting material. A stator core provided with such moulded-on formations of lacquer or other insulation substance at the end faces of the stator core is further very well suited for fixation of the bearing supports of the rotor assembly to the stator core by bonding through cementing or moulding-in. At such a bonding operation a cement or moulding substance is applied so as to form a connection between the bearing support and the moulding of lacquer or other insulation substance, preferably in such a way that cement or moulding substance cannot penetrate in between the mating guide and abutment surfaces of the stator core and the bearing support. A reliable and rigid fixation of the bearing support without any impairing of the accuracy of positioning will be attained in this way. Since the moulded mass of lacquer or other insulation substance seals off the end openings of the stator slots the bonding can be effected without any risk of cement or moulding-in mass penetrating into the rotor cavity.

Figure 3:
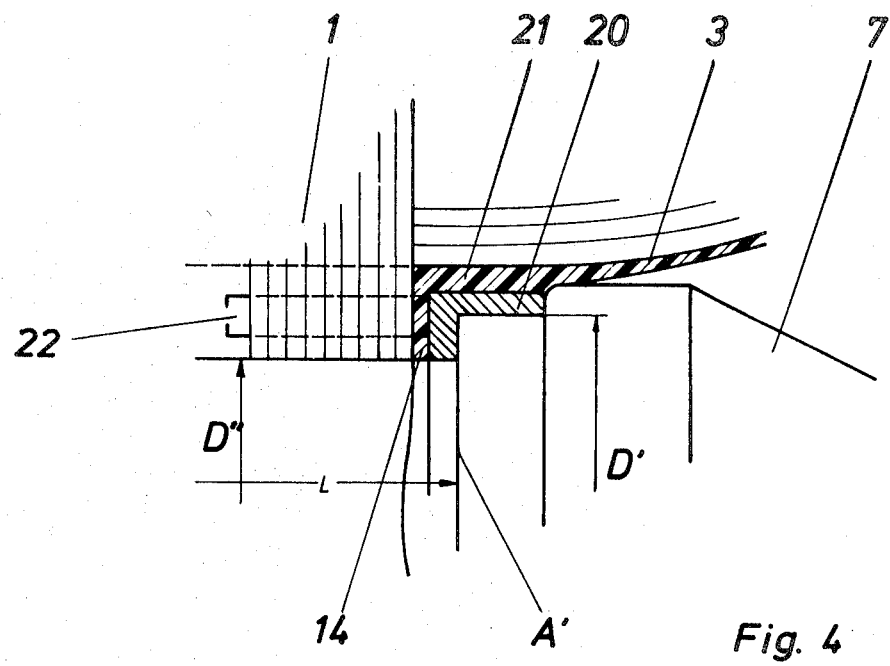
FIG. 3 is a similar fragmentary section view of a stator core with a separate, moulded-in fixation member.

In FIG. 3 a special guide ring for securing a bearing support to the stator is illustrated. The ring 20 is slid over a mandrel 7 and is urged by means of the latter against the end plate of the stator core 1. By application of lacquer or other moulding substance 21 between the stator core 1 and the windings 3 on one hand and the ring 20 on the other the ring is secured permanently in its position. The layer 14 of lacquer or insulating substance compensates the dimensional and geometrical faults of the stator core as earlier described.

Figure 4:
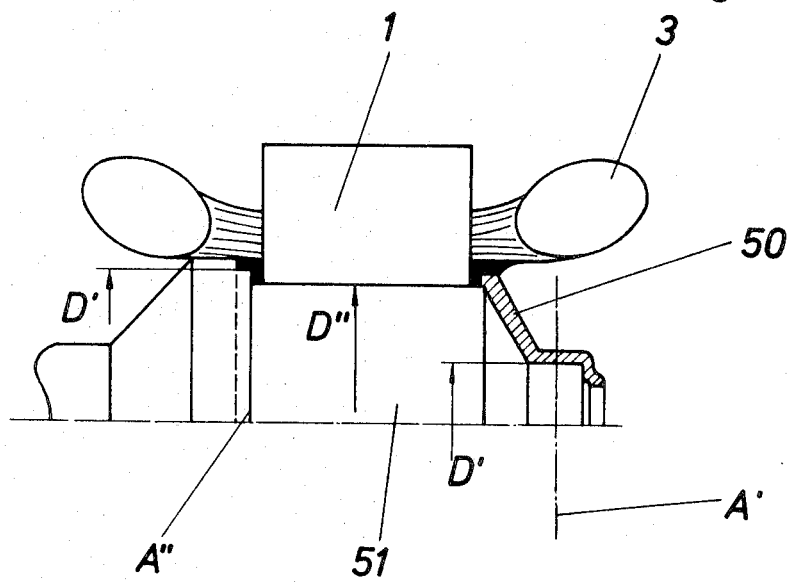
FIG. 4 is a longitudinal section view of a stator with a moulded-in bearing support at one end of the stator.

FIG. 4 is a longitudinal section view of a stator at one end of which a bearing support 50 has been moulded in or cemented to the stator core 1 and the stator windings 3, whereas locating and bonding surfaces for a separate bearing support have been moulded on at the opposite end of the stator core. The Figure shows diagrammatically how a mandrel 51 guided by the rotor cavity D"1 has been inserted and keeps at its end the bearing support 50 centered and in abutting engagement with the mating surfaces during the application of lacquer or moulding-in substance, while it affords at its opposite end the surfaces required for shaping the areas to be engaged by the bearing support. The coaxialness of the guide surfaces D' and D" and the parallelity of the planes A' and A" is secured thereby at the same time as the lacquer or other insulation substance is prevented by the mandrel from penetrating into the space reserved for the rotor.

Figure 5:
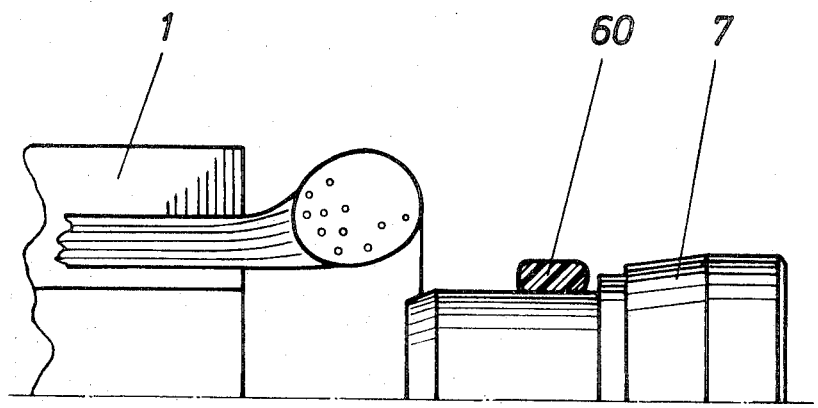
FIGS. 5 and 6 are fragmentary longitudinal section views showing an annulus of a mouldable setting substance and a moulding member for forming this annulus into a moulding at the end face of a stator core.
Figure 6:
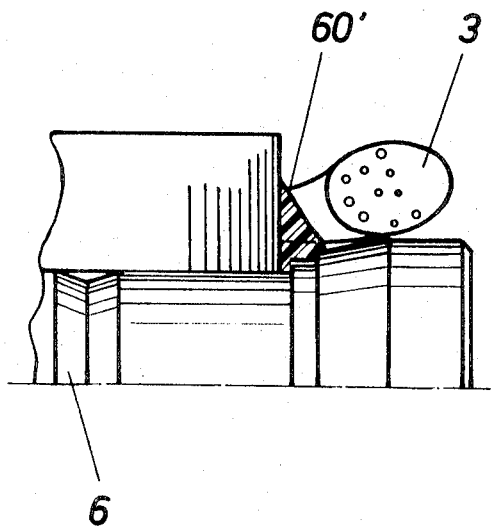

FIG. 5 illustrates how a mandrel 7 has been provided with an annulus 60 of a mouldable setting substance which is urged in a plastic state by means of the mandrel against the end face of the stator core 1, whereby locating surfaces are formed in the material of the annulus inside the winding heads 3 of the stator windings by the surfaces of the mandrel active during this compression, as seen from FIG. 6. The resulting moulding 60' can serve after the material has set for the fixation of a cup-shaped bearing support in a manner earlier described. In FIG. 6 is also shown the inner end of an opposed mandrel 6 which moulds an annulus corresponding to the annulus 60 at the opposite end face of the stator core (not illustrated).

When it is referred in the foregoing specification and in the appended claims to lacquer, insulation substance or the like, each, preferably electrically insulating substance which can be brought into a solid state with dimensional stability from a more or less liquid state is to be understood. Among suitable materials curable synthetic resins and synthetic enamels may be mentioned.

I claim:

1. Rotary electric apparatus comprising a stator core consisting of a plurality of stator plates having slots to accomodate stator windings, said stator windings extending beyond the axial end faces of the stator plates at opposite ends of the stator core, the stator core defining a rotor chamber, a rotor mounted on a shaft for rotary motion relative to the stator, bearing means mounted on said shaft, bearing support means connecting said stator unit to said bearing means and molded guide member made of an electrically non-conducting material secured to the stator unit at opposite axial end faces thereof, each of said guide members sealing the end openings of the stator slots and in bonding engagement with the windings and each defining a seat for the bearing support member, each of said guide members being of an L-shaped cross section to provide an annular centering surface concentric with the rotor axis and truly radial abutment surfaces parallel to each other and disposed in planes perpendicular to the rotor axis and spaced apart an axial distance slightly greater than the overall length of the stator core, the vertical leg of said guide member terminating in an edge of a diameter coincident and aligned with the outer periphery of the rotor cavity.

* * * * *